(12) United States Patent
Funk

(10) Patent No.: US 10,260,264 B2
(45) Date of Patent: Apr. 16, 2019

(54) WINDING RATCHET SYSTEM FOR COUNTERBALANCING SYSTEM

(71) Applicant: CANIMEX INC., Drummondville, Québec (CA)

(72) Inventor: Yannick Funk, Drummondville (CA)

(*) Notice: Subject to any disclaimer, the term of this patent is extended or adjusted under 35 U.S.C. 154(b) by 170 days.

(21) Appl. No.: 15/115,528

(22) PCT Filed: Feb. 2, 2015

(86) PCT No.: PCT/CA2015/050075
§ 371 (c)(1),
(2) Date: Jul. 29, 2016

(87) PCT Pub. No.: WO2015/113166
PCT Pub. Date: Aug. 6, 2015

(65) Prior Publication Data
US 2017/0328104 A1    Nov. 16, 2017

Related U.S. Application Data

(60) Provisional application No. 61/934,082, filed on Jan. 31, 2014.

(51) Int. Cl.
*E05D 13/00* (2006.01)
*B60J 5/12* (2006.01)

(52) U.S. Cl.
CPC ............ *E05D 13/1261* (2013.01); *B60J 5/12* (2013.01); *E05Y 2201/492* (2013.01)

(58) Field of Classification Search
CPC .... E05D 13/1261; E05D 13/1253; B60J 5/12; E05Y 2201/492
See application file for complete search history.

(56) References Cited

U.S. PATENT DOCUMENTS

| 1,807,879 A | 6/1931 | Simon |
| 1,994,142 A * | 3/1935 | Madsen ................. E05D 15/24 16/104 |
| 2,985,446 A | 5/1961 | Marmont et al. |

(Continued)

OTHER PUBLICATIONS

International Search Report issued in International Patent Application No. PCT/CA2015/050075 dated Apr. 29, 2015.

*Primary Examiner* — Katherine W Mitchell
*Assistant Examiner* — Abe Massad
(74) *Attorney, Agent, or Firm* — BakerHostetler

(57) ABSTRACT

A tensioning assembly for winding a winding system includes a support bracket connectable to a fixed frame, a collar portion removably mountable onto a shaft of the winding system proximate to the support bracket, a ratchet wheel, and a pawl component. The collar portion is removably secured onto the shaft. The ratchet wheel is securely mounted onto the collar portion and is rotatable therewith. The ratchet wheel has a plurality of teeth and a plurality of corresponding recesses. The pawl component is operatively mountable on the support bracket and is moveable with respect to said support bracket, the pawl component having an extremity being positioned, shaped and sized with respect to at least one recess of the ratchet wheel for allowing rotation of the shaft along a winding direction, and for blocking rotation of the shaft along an unwinding direction.

23 Claims, 10 Drawing Sheets

(56) References Cited

U.S. PATENT DOCUMENTS

| | | | |
|---|---|---|---|
| 3,038,535 A | * | 6/1962 | Stroup ................ E05D 13/1261 16/401 |
| 3,660,938 A | | 5/1972 | Ross, Jr. et al. |
| 4,583,706 A | * | 4/1986 | Whitehouse ........ E06B 9/17015 160/133 |
| 4,882,806 A | * | 11/1989 | Davis .................. E05D 13/1261 16/196 |
| 6,174,575 B1 | | 1/2001 | Foucault et al. |
| 6,279,268 B1 | | 8/2001 | Beaudoin et al. |
| 6,378,170 B1 | | 4/2002 | Foucaul et al. |
| 6,485,006 B1 | | 11/2002 | Beaudoin et al. |
| 6,502,281 B2 | | 1/2003 | Foucault et al. |
| 6,527,037 B2 | * | 3/2003 | Daus ........................ E06B 9/60 160/133 |
| 6,681,809 B2 | | 1/2004 | Savard et al. |
| 6,694,673 B2 | | 2/2004 | Savard et al. |
| 6,712,116 B2 | * | 3/2004 | Beaudoin ............ E05D 13/003 160/188 |
| D490,685 S | | 6/2004 | Beaudoin et al. |
| 6,742,564 B2 | * | 6/2004 | Martin ................ E05D 13/1261 160/188 |
| 6,907,964 B2 | | 6/2005 | Savard |
| 6,931,810 B2 | | 8/2005 | Beaudoin et al. |
| 6,959,751 B2 | | 11/2005 | Savard et al. |
| 6,986,378 B2 | | 1/2006 | Beaudoin et al. |
| 6,988,527 B2 | | 1/2006 | Savard et al. |
| 7,000,292 B2 | | 2/2006 | Beaudoin et al. |
| 7,000,354 B2 | | 2/2006 | Beaudoin et al. |
| D520,338 S | | 5/2006 | Robert et al. |
| D524,633 S | | 7/2006 | Robert et al. |
| 7,086,441 B2 | | 8/2006 | Barriault et al. |
| 7,254,868 B2 | * | 8/2007 | Mullet ................ E05D 13/003 16/198 |
| 7,350,333 B2 | | 4/2008 | Michaud et al. |
| 7,441,749 B2 | | 10/2008 | Beaudoin et al. |
| 7,543,625 B2 | | 6/2009 | Beaudoin et al. |
| 7,600,344 B2 | | 10/2009 | Michaud |
| 7,686,061 B2 | * | 3/2010 | Mullet .................... E05D 15/24 160/191 |
| 7,784,521 B2 | | 8/2010 | Mullet et al. |
| 2002/0117787 A1 | | 8/2002 | Beaudoin et al. |
| 2004/0000109 A1 | | 1/2004 | Bourassa et al. |
| 2004/0020609 A1 | | 2/2004 | Savard et al. |
| 2005/0006545 A1 | | 1/2005 | Barriault et al. |
| 2006/0137138 A1 | | 6/2006 | Mullet et al. |
| 2007/0012410 A1 | | 1/2007 | Savard et al. |
| 2007/0084012 A1 | | 4/2007 | Savard et al. |
| 2007/0204515 A1 | | 9/2007 | Barriault et al. |
| 2007/0283525 A1 | | 12/2007 | Beaudoin et al. |
| 2009/0314869 A1 | | 12/2009 | Savard et al. |
| 2011/0240236 A1 | | 10/2011 | Savard et al. |
| 2013/0318879 A1 | * | 12/2013 | Peterse .................... E05F 5/00 49/386 |

\* cited by examiner

WINDING RATCHET SYSTEM FOR COUNTERBALANCING SYSTEM

REFERENCE TO RELATED APPLICATIONS

This application is the U.S. national stage of International Application No. PCT/CA2015/050075, filed Feb. 2, 2015, which claims the priority of U.S. Provisional Application No. 61/934,082, filed Jan. 31, 2014, the disclosures of which are all incorporated herein by reference in their entireties.

FIELD OF THE INVENTION

The present invention relates to the field of counterbalancing systems as used in overhead doors of trucks, vans and the like. More particularly, the present invention relates to a winding ratchet system (hereinafter referred to also as a "tensioning assembly") for use with such counterbalancing systems.

BACKGROUND

It is known that there are two general types of rear truck doors: a) side-opening doors and b) doors of overhead type.

In both cases, manufacturers always want to have the tallest opening possible to ease and optimize the loading of the vehicle (ex. truck, van, etc.).

For a side-opening door, there are no limitation constraints as to the upper section. In contrast, for doors of overhead type, the counterbalancing system is always on the top of the door which reduces the usable opening space for the vehicle. For this reason, manufacturers try to have counterbalancing systems which take up the least amount of headroom, etc.

It is also known that in North American markets, there are mainly two types of counterbalancing systems that are used with such overhead doors.

The first type is with a "live" axle. Typically, a cable links together the bottom of the door to a drum. This drum is fixed to a corresponding rotating shaft (i.e. "live" axle) of the counterbalancing system. Counterbalancing is usually made with a spring-plug assembly including a stationary plug fixed to an anchor plate, a winding plug fixed to the shaft, and a torsion spring that links the two plugs together.

The second type of counterbalancing systems is with a "dead" axle shaft. In this case, a "drum-plug" is free to move and rotate on the counterbalancing shaft. Typically, a cable links together the bottom of the door to the drum-plug. On the other side, a winding plug is fixed to the shaft. The counterbalancing system links the winding plug to the drum-plug via the spring.

Taking now a closer look at counterbalancing systems of the second type, that is, "dead axle shaft" systems, particularly in the case of truck doors provided with such a dead axle shaft counterbalancing system, it is also known that the round tubular shaft is normally held in place with three brackets fixed to the frame of the truck door.

Typically, manufacturers provide a square shape onto the tubular shaft which fits into a corresponding square hole in one of these three brackets, namely the central bracket, to block the rotation of the tubular shaft. These types of brackets are as small as possible to reduce the headroom of the counterbalancing system.

Currently, such a conventional counterbalancing system is put under tension by applying turns to the winding plug through the winding hole and then fixing the winding plug to the shaft using set screws. Given that space available within the vehicle (ex. truck) to add turn(s) to the winding plug is limited to about 90 degrees, the winding plug normally has 4 or 6 winding holes, and 2 or 3 set screws.

Industry typically uses oil tempered springs to counterbalance the weight of the door. This kind of spring relaxes over time which reduces the counterbalancing torque it is able to provide, and makes the door become "off-balanced" (i.e. not properly counterbalanced, etc.).

Manufacturers and/or users of these counterbalancing systems need to re-adjust the spring tension occasionally to keep an optimal weight counterbalance for the door.

Another drawback associated with these conventional counterbalancing systems is that because of the limited space within the vehicle, adding turns to the counterbalancing system is a difficult operation. Also, in some cases, set screws and winding holes are not easily accessible.

Furthermore, before releasing tension on a given winding hole, the tension of the spring needs to be completely secured by a second hole. Therefore, at least 2 holes need to be accessible at the same time. If the tension is not properly secured, the system will unwind which might be undesirable for installer and/or cause damage to the spring.

Another drawback associated with these conventional counterbalancing systems is that tightening of the screws often deforms the tubular shaft. When re-adjusting the tension of the spring, the screw needs to be un-tightened and then re-tightened again, in a close range, which weakens the tubular shaft and makes the re-adjustment even more difficult since the shaft progressively becomes oval-shaped.

The Assignee of the present application has developed various new products and manufacturing processes over the years, particularly in relation to cones, plugs, counterbalancing systems and the like, for which various US utility patents and design patents have been obtained (see some examples listed below), the contents of which are incorporated herein by reference: U.S. Pat. Nos. 6,174,575; 6,279,268; 6,378,170; 6,485,006; 6,502,281; 6,681,809; 6,694,673; 6,712,116; 6,907,964; 6,931,810; 6,959,751; 6,986,378; 6,988,527; 7,000,292; 7,000,354; 7,086,441; 7,350,333; 7,441,749; 7,543,625; 7,600,344; D490,685; D520,338; and D524,633.

The Assignee of the present application has also filed various other US patent applications having become public, the contents of which are also incorporated herein by reference: 2002/0117787 A1; 2004/0000109 A1; 2004/0020609 A1; 2005/0006545 A1; 2007/0012410 A1; 2007/0084012 A1; 2007/0204515 A1; 2007/0283525 A1; 2009/0314869 A1; and 2011/0240236 A1.

Nonetheless, despite all of these innovations, there is always a need to continue improving and find better and/or different ways of winding (ex. tensioning, etc.) a counterbalancing system such as the ones used in trucks, vans and the like.

SUMMARY OF THE INVENTION

An object of the present invention is to provide a tensioning assembly (i.e. "winding system", etc.) which, by virtue of its design and components, satisfies some of the above-mentioned needs and which is thus an improvement over other related tensioning assemblies and/or winding methods known in the prior art.

In accordance with the present invention, the above object is achieved, as will be easily understood from the present description, with a tensioning assembly such as the one briefly described herein and such as the one exemplified in the accompanying drawings.

More particularly, according to one aspect of the present invention, there is provided a tensioning assembly for winding a shaft of a winding system, the shaft being rotatable within the winding system along opposite winding and unwinding directions, the tensioning assembly comprising:

a support bracket connectable to a fixed frame, and having an orifice shaped and sized for receiving the shaft of the winding system through said orifice;

a collar portion removably mountable onto the shaft, and being proximate to the support bracket, the collar portion having a securing assembly for removably securing the collar portion onto the shaft;

a ratchet wheel securely mounted onto the collar portion and being rotatable therewith, the ratchet wheel being positionable adjacent to the support bracket, and being provided with a plurality of teeth and a plurality of corresponding recesses; and a pawl component operatively mountable on the support bracket and being moveable with respect to said support bracket, the pawl component having an extremity being positioned, shaped and sized with respect to at least one recess of the ratchet wheel for allowing rotation of the shaft along the winding direction, and for blocking rotation of the shaft along the unwinding direction.

According to another aspect of the invention, there is also provided a method of assembling and/or mounting the above-mentioned tensioning assembly onto a corresponding counterbalancing system (ex. overhead counterbalancing system of a truck door, etc.).

According to yet another aspect of the invention, there is also provided a counterbalancing system provided with the above-mentioned tensioning assembly.

According to yet another aspect of the invention, there is also provided a method of using the above-mentioned tensioning assembly and/or counterbalancing system.

According to yet another aspect of the invention, there is also provided a kit with components for assembling the above-mentioned tensioning assembly and/or counterbalancing system.

According to yet another aspect of the present invention, there is also provided a set of components for interchanging with components of the above-mentioned kit.

According to yet another aspect of the present invention, there is also provided a method of assembling components of the above-mentioned kit and/or set.

According to yet another aspect of the present invention, there is also provided a method of doing business with the above-mentioned tensioning assembly, counterbalancing system, components thereof, kit, set and/or method(s).

The objects, advantages, and other features of the present invention will become more apparent upon reading of the following non-restrictive description of preferred embodiments thereof, given for the purpose of exemplification only, with reference to the accompanying drawings.

DETAILED DESCRIPTION OF PREFERRED EMBODIMENTS OF THE INVENTION

Figure 1:
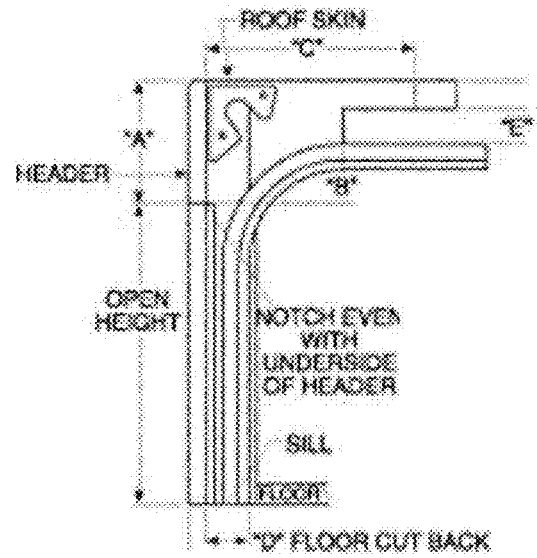
FIG. 1 is a partial schematic side view of an overhead truck door.

In the following description, the same numerical references refer to similar elements. Furthermore, for sake of simplicity and clarity, namely so as to not unduly burden the figures with several reference numbers, only some figures have been provided with reference numbers, and components and features of the present invention illustrated in other figures can be easily inferred therefrom. The embodiments, geometrical configurations, materials mentioned and/or dimensions shown in the figures are preferred, for exemplification purposes only.

Moreover, although the present invention was primarily designed for use with a shaft or an axle (whether "dead" and/or "live") of a counterbalancing system, preferably such as the ones used in trucks, vans and the like, it may be used with other objects and/or in other types of applications, as apparent to a person skilled in the art. For this reason, expressions such as "shaft, "axle", "dead", "live", "truck", "van", etc., used herein should not be taken so as to limit the scope of the present invention and include all other kinds of objects and/or applications with which the present invention could be used and may be useful.

Moreover, in the context of the present invention, the expressions "assembly", "ratchet", "system", "winder", "device", "tool", "unit", "product", as well as any other equivalent expressions and/or compound words thereof, may be used interchangeably. The same applies for any other mutually equivalent expressions, such as "cone" and "plug" for example, as well as "winding", "turning", "forcing" and "putting under tension", or even "axle" and "shaft", as also apparent to a person skilled in the art.

Furthermore, in the context of the present description, it will be considered that all elongated objects will have an implicit "longitudinal axis" or "centerline", such as the longitudinal axis of a shaft for example, or the centerline of a tube or a fastener, for example, and that expressions such as "connected" and "connectable", or "mounted" and "mountable", may be interchangeable, in that the present invention also relates to a kit with corresponding components for assembling a resulting fully assembled and operational tensioning assembly, and/or a counterbalancing system and/or a resulting door assembly including the same.

In addition, although the preferred embodiments of the present invention as illustrated in the accompanying drawings comprise various components, and although the preferred embodiments of the tensioning assembly and corresponding parts as shown consist of certain geometrical configurations as explained and illustrated herein, not all of these components and geometries are essential to the invention and thus should not be taken in their restrictive sense, i.e. should not be taken so as to limit the scope of the present invention. It is to be understood, as also apparent to a person skilled in the art, that other suitable components and cooperation therebetween, as well as other suitable geometrical configurations may be used for the tensioning assembly and corresponding parts according to the present invention, as will be briefly explained herein and as can be easily inferred herefrom by a person skilled in the art, without departing from the scope of the present invention.

LIST OF NUMERICAL REFERENCES FOR SOME OF THE CORRESPONDING POSSIBLE COMPONENTS ILLUSTRATED IN THE ACCOMPANYING DRAWINGS 1. tensioning assembly (also referred to herein as "ratchet system")
3. shaft (ex. axle)
3a. longitudinal axis (of shaft)
5. winding system (ex. counterbalancing system, cranking system, etc.)
7a. winding direction (of shaft)
7b. unwinding direction (of shaft)
9. support bracket
11. orifice
13. collar portion
15. securing assembly
17. ratchet wheel
19. teeth (of ratchet wheel)
19a. sliding portion (of teeth)
19b. stopping portion (of teeth)
21. recesses (of ratchet wheel)
23. pawl component
25. extremity (of pawl component)
27. mounting portion (of support bracket)
29. protruding portion (of support bracket)
31. first sub-portion (of mounting portion)
33. second sub-portion (of mounting portion)
35. mounting plate
35a. first mounting plate
35b. second mounting plate
37. wall bracket
39. mounting hole (of wall bracket)
41. mounting hole (of mounting plate)
43. securing hole (of wall bracket)
45. fastener (for mounting hole)
47. abutment flange
49. arched notch (of abutment flange)
51. hub portion
53. inner diameter (of both collar and hub portions)
55. outer diameter (of collar portion)
57. outer diameter (of hub portion)
59. spring
59a. first end (of spring)
59b. second end (of spring)
59c. main portion (of spring)
61. first flange (of pawl component)
63. second flange (of pawl component)
65. bridging flange (of pawl component)
67. pivot (ex. rivet)
69. distal rim (of pawl component)
71. fastener (for collar portion)
73. through-hole (of collar portion)
75. restraining assembly
77. circlip
79. peripheral groove (of hub portion)

Broadly described, and as better exemplified in the accompanying drawings, the present invention relates to a tensioning assembly (1), similar to a ratchet system, in order to facilitate winding in a counterbalancing system (ex. such as those in overhead doors of trucks, vans and the like), in a simpler, easier, faster, more effective and/or more reliable manner.

Figure 2:
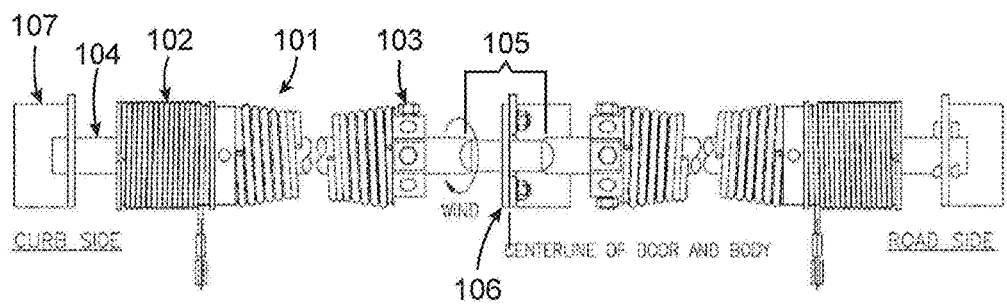
FIG. 2 is a side view of a standard dead axle counterbalancing system.

As mentioned earlier, FIG. 1 represents a schematic side view of an overhead truck door, whereas FIG. 2 represents a standard live axle counterbalancing system.

Typically, torsion spring (101) is held by a "drum-plug" (102) on one side and a winding plug (103) on the second side. System usually has two torsion springs (101) to counterbalance the door. Middle section of the tubular shaft (103) has a square shape (105). The central bracket (106) blocks the rotation of the tubular shaft (104) with a square shape. Side brackets (107) usually have a round hole and only support the weight of the counterbalancing system.

Figure 3:
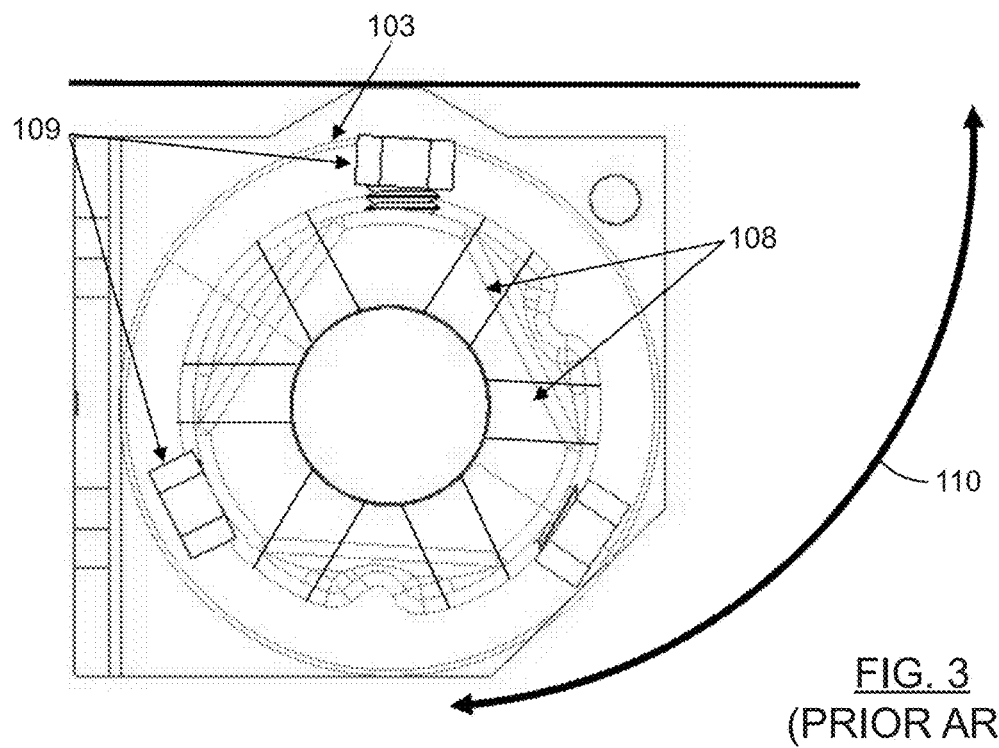
FIG. 3 is a side view of some of the components found in the system of FIG. 2, including a winding plug with six winding holes and three set screws, this view illustrating the limited range (about 90 degrees) of the accessible area being workable.

As also mentioned earlier, FIG. 3 represents a side view of a winding plug (103) with six winding holes (108) and three set screws (109). Only the features in the accessible area (110) are workable, this view illustrating the limited range (about 90 degrees) of the accessible area being workable.

In contrast, and broadly described, as better exemplified in the accompanying drawings, the present invention relates to a tensioning assembly (1), similar to a "ratchet system", designed to wind (ex. turn, crank, put under tension, increase in tension, etc.) a winding system (5), such as a counterbalancing system (3) of a trailer truck, via a rotation of a corresponding shaft (3), for example, in a much simpler, easier, faster, more effective and/or more reliable manner than what is possible with conventional systems.

According to one general aspect of the present system, there is provided a tensioning assembly (1) for winding a shaft (3) of a winding system (5), the shaft (3) being rotatable within the winding system (5) along opposite winding and unwinding directions (7a,7b). The tensioning assembly (1) comprises a support bracket (9) connectable to a fixed frame, and having an orifice (11) shaped and sized for receiving the shaft (3) of the winding system (5) through said orifice (11). The tensioning assembly (1) also comprises a collar portion (13) removably mountable onto the shaft (3), and being proximate to the support bracket (9), the collar portion (13) having a securing assembly (15) for removably securing the collar portion (13) onto the shaft (3). The tensioning assembly (1) also comprises a ratchet wheel (17) securely mounted onto the collar portion (13) and being rotatable therewith, the ratchet wheel (17) being positionable adjacent to the support bracket (9), and being provided with a plurality of teeth (19) and a plurality of corresponding recesses (21). The tensioning assembly (1) also comprises a pawl component (23) operatively mountable on the support bracket (9) and being moveable with respect to said support bracket (9), the pawl component (23) having an extremity (25) being positioned, shaped and sized with respect to at least one recess (21) of the ratchet wheel (17) for allowing rotation of the shaft (3) along the winding direction (7a), and for blocking rotation of the shaft (3) along the unwinding direction (7b).

As can be easily understood when referring to FIGS. 5-14, the support bracket (9) may comprise a mounting portion (27) and a protruding portion (29), the orifice (11) being provided on the protruding portion (29) of the support bracket (9). The mounting portion (27) may also comprise first and second sub-portions (31,33), where according to a possible embodiment, the first sub-portion (31) of the mounting portion (27) comprises at least one mounting plate (35), and optionally, comprises a pair of opposite mounting plates (35a,35b). The second sub-portion (33) may comprise a wall bracket (37) being shaped, positioned and sized for cooperation with the at least one mounting plate (35).

As better shown in FIGS. 11-14, the wall bracket (37) may comprises at least one mounting hole (39) configured for alignment with at least one corresponding mounting hole (41) of the at least one mounting plate (35), and the wall bracket (37) may comprise at least one securing hole (43) configured for receiving a corresponding fastener (45) in order to secure the wall bracket (37) onto the fixed frame.

According to the possible embodiment, the wall bracket (37) comprises a pair of mounting holes (39) configured for alignment with a pair of corresponding mounting holes (41) of the at least one mounting plate (35), and the wall bracket (37) further comprises a pair of securing holes (43) configured for receiving corresponding fasteners (45) in order to secure the wall bracket (37) onto the fixed frame, with the mounting holes (39) of the wall bracket (37) being more distally apart from one another than the securing holes (43) of the wall bracket (37).

The wall bracket (37) may also comprise an abutment flange (47) for abutting against a surface of the protruding portion (29) when the first and second sub-portions (31,33) of the mounting portion (27) are assembled onto one another, and according to a possible embodiment, the abutment flange (47) is provided with an arched notch (49) being complementary to the shaft (3) extendable through the orifice (11) of the support bracket (9).

Referring now to FIGS. 5-10, the tensioning assembly (1) may comprise a hub portion (51), the hub portion (51) being configured for removably mounting onto the support bracket (9), and according to another possible embodiment, the hub portion (51) is configured for removably mounting into the orifice (11) of the support bracket (9).

Figure 9:
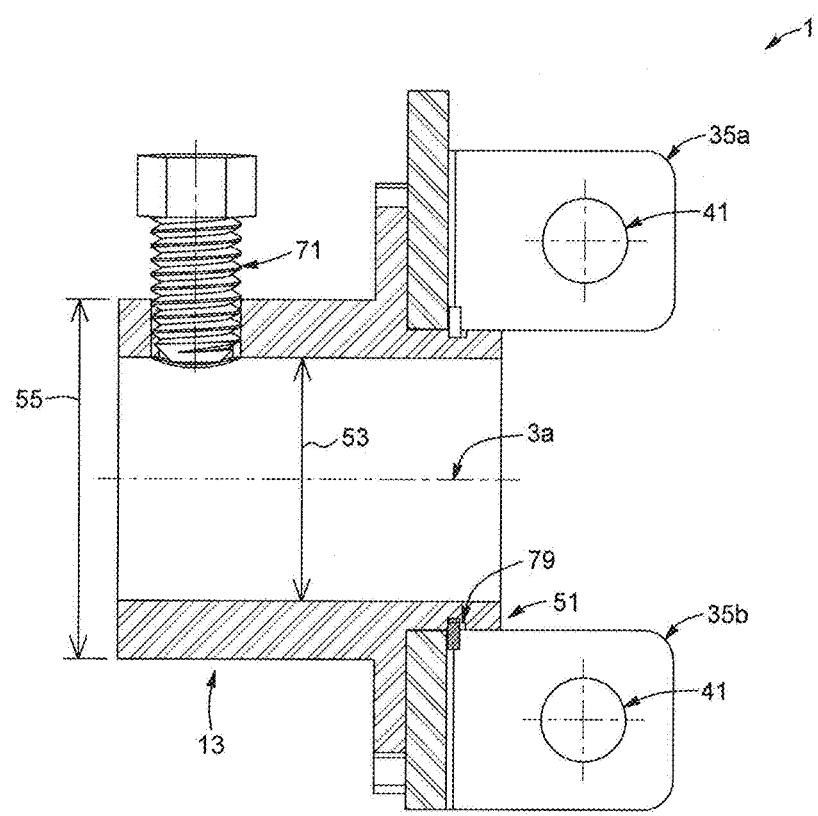
FIG. 9 is a cross-sectional view taken along line IX-IX of what is shown in FIG. 8.
Figure 10:
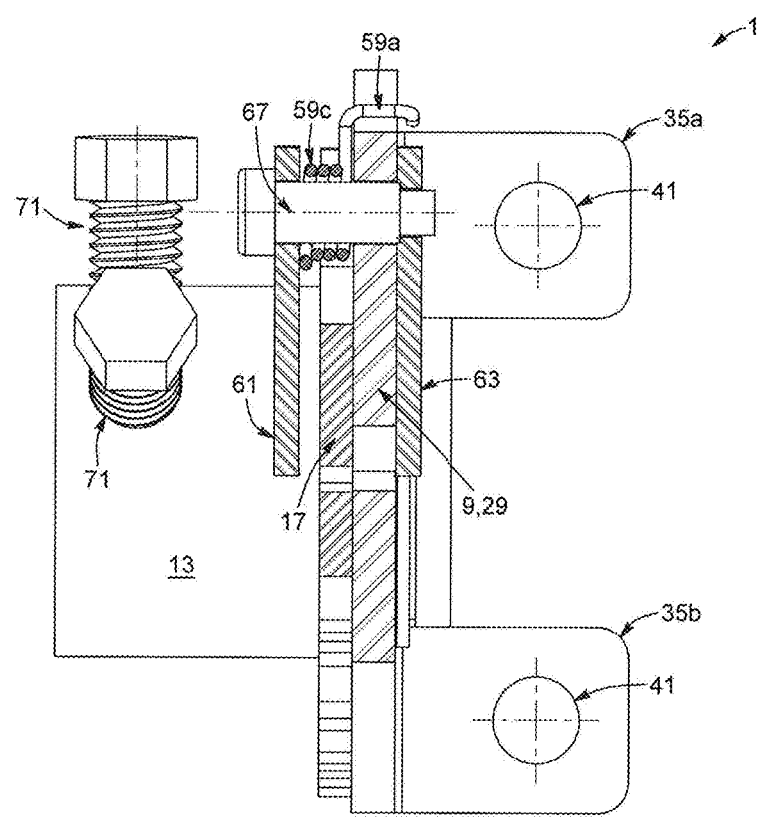
FIG. 10 is a cross-sectional view taken along line X-X of what is shown in FIG. 8.
Figure 11:
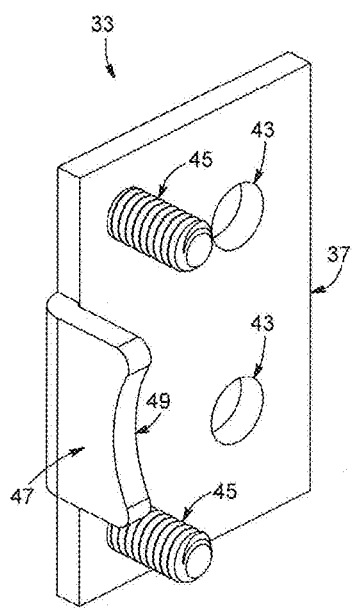
FIG. 11 a front perspective view of an assembled sub-portion of a mounting portion of a support bracket to be used with the tensioning assembly of FIG. 5 according to a possible embodiment of the present invention.
Figure 12:
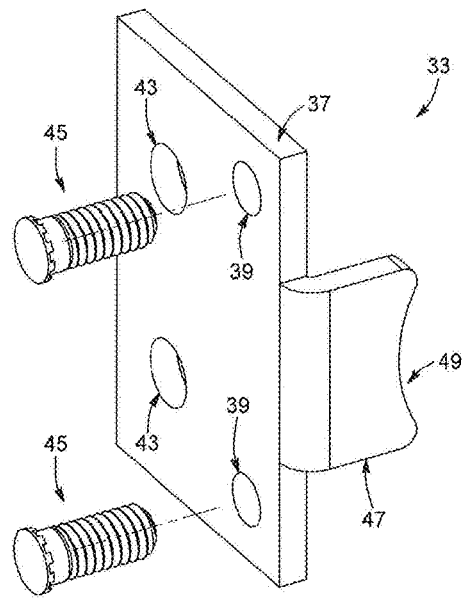
FIG. 12 is an exploded rear view of the components shown in FIG. 11.
Figure 13:
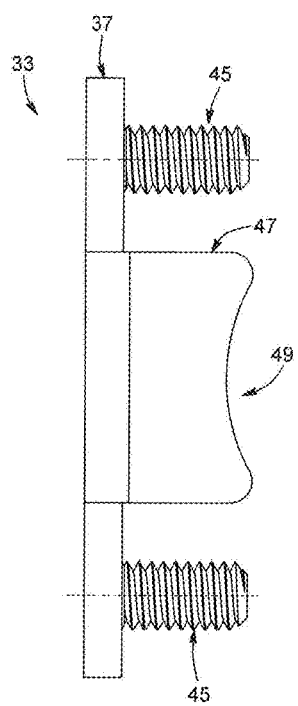
FIG. 13 is a front elevational view of what is shown in FIG. 11.
Figure 14:
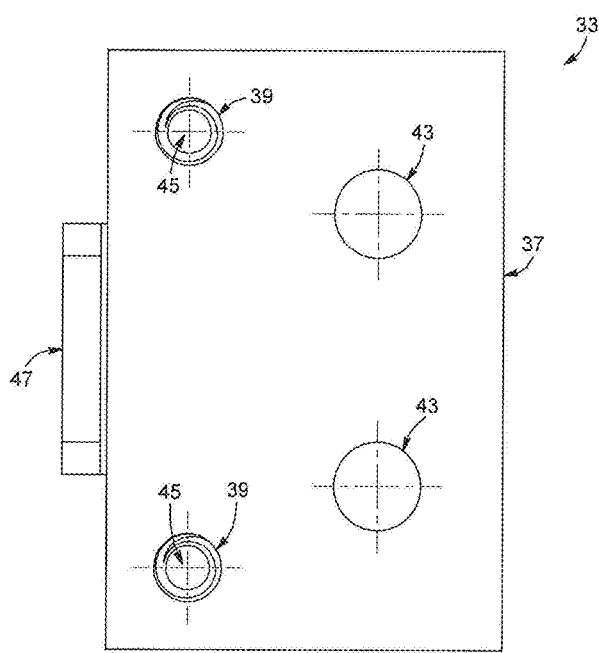
FIG. 14 is a side view of what is shown in FIG. 13.

According to a preferred embodiment, the hub portion (51) is securely mounted to the collar portion (13), and the collar portion (13) and the hub portion (51) are made integral to another (i.e. made of a single piece, and of a single material, etc.), and as better illustrated in FIGS. 5-10, both the collar portion (13) and the hub portion (51) may be cylindrical, with a substantially same inner diameter (53), said inner diameter (53) being configured for receiving the shaft (3) of the winding system (5) therethrough, while the collar portion (13) and the hub portion (51) may be different outside diameters (55,57), as better shown in FIG. 9, for example.

As better illustrated in FIGS. 5-8, the ratchet wheel (17) comprises n teeth (19), and n−1 corresponding recesses (21), with n being greater than 2. According to the embodiment shown, the ratchet wheel (17) comprises 12 teeth (19), and 11 corresponding recesses (21), so as allow the shaft (3) to rotate along the winding direction (7a) by rotational increments of about 30° angles, and as also shown, the teeth (19) of the ratchet wheel (17) may be wave-shaped, with a sliding portion (19a) and a stopping portion (19b).

As can be easily understood, the pawl component (23) is operable between an engaged configuration with respect to the ratchet wheel (17) where the shaft (3) is biased to rotate only along the winding direction (7a), and a disengaged configuration with respect to the ratchet wheel (17) where the shaft (3) is allowed to rotate along both winding and unwinding directions (7a,7b).

According to a possible embodiment, and as better shown in FIGS. 5-10, the pawl component (23) may biased towards the engagement configuration via a spring (59), the spring having one end (59a) operatively connectable to the support bracket (9) and another end (59b) operatively connectable to the pawl component (23).

The pawl component (23) may comprise first and second flanges (61,63) connected by a bridging flange (65), the pawl component (23) being positioned, shaped and sized so as to contain the ratchet wheel (17) between its first and second flanges (61,63).

According to a possible embodiment, and as better shown in FIGS. 5, 6, 7 and 10, the pawl component (23) is further positioned, shaped and sized so as to contain the ratchet wheel (17) and a portion of the support bracket (9) between its first and second flanges (61,63), and advantageously, the pawl component (23) is further positioned, shaped and sized so as to contain a main portion (59c) of the spring (59) between its first and second flanges (61,63).

As can be easily understood when referring to FIGS. 5-10, the pawl component (23) can be pivotably mountable with respect to the support bracket (9) via a pivot (67) extending through at least one of the first and second flanges (61,63), but according to a possible embodiment, the pivot (67) extends through both of the first and second flanges (61,63), and further extends through a main portion (59c) of the spring (59).

Figure 5:
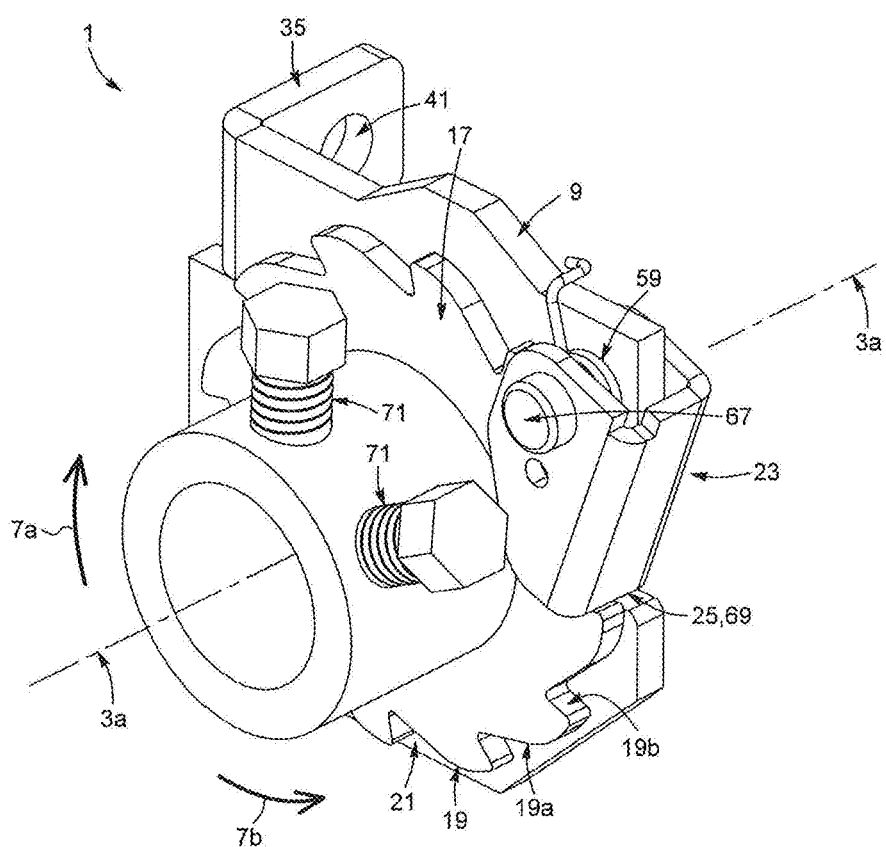
FIG. 5 is a front perspective view of an assembled tensioning assembly according to a possible embodiment of the present invention.
Figure 6:
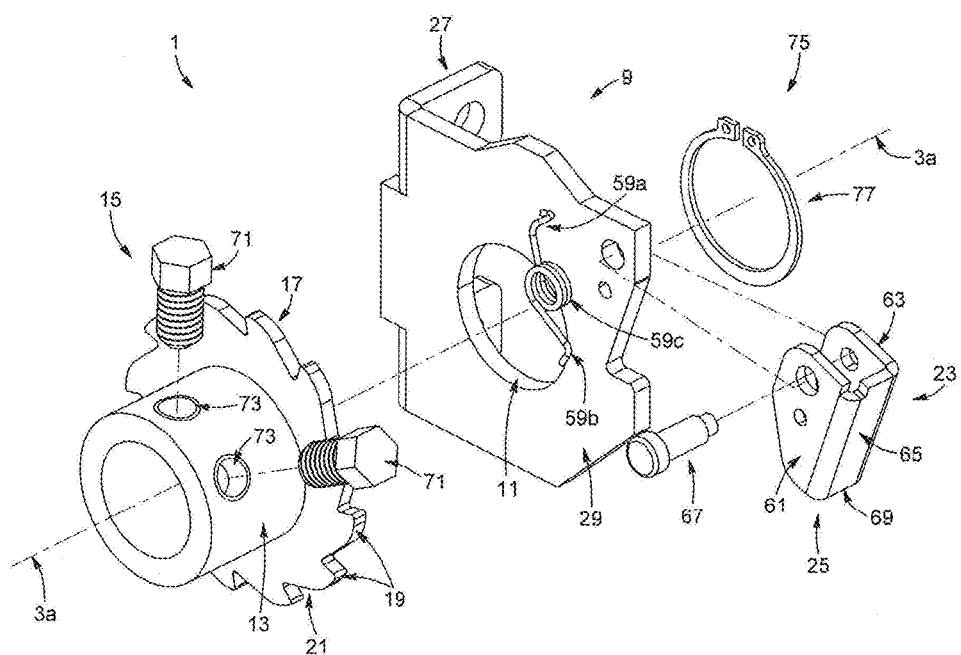
FIG. 6 is an exploded view of the components shown in FIG. 5.
Figure 7:
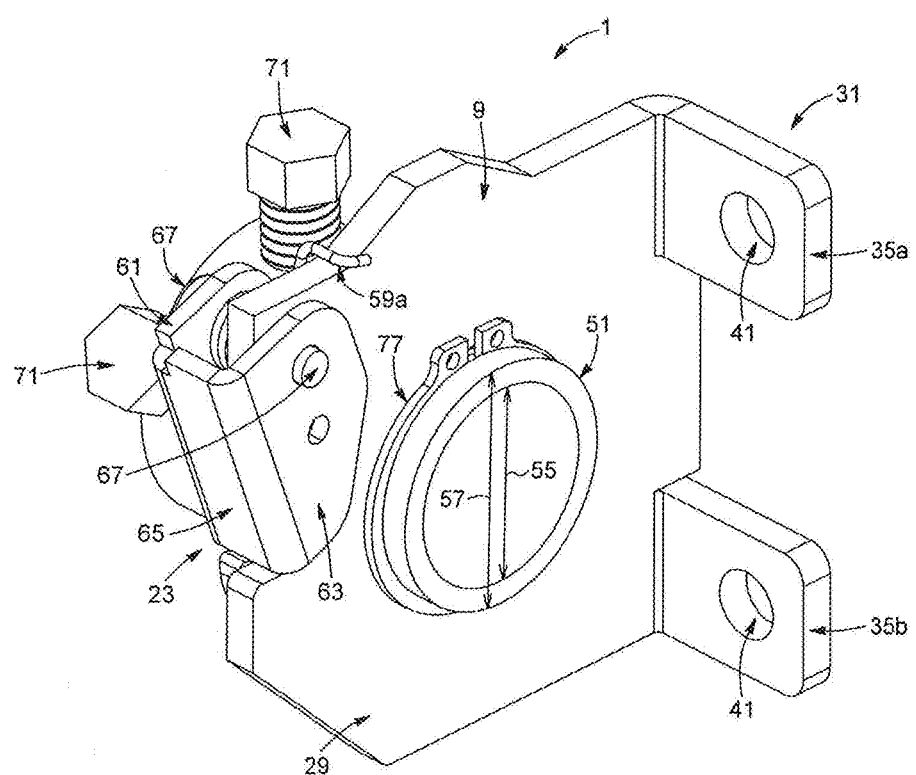
FIG. 7 is a rear perspective view of what is shown in FIG. 5.
Figure 8:
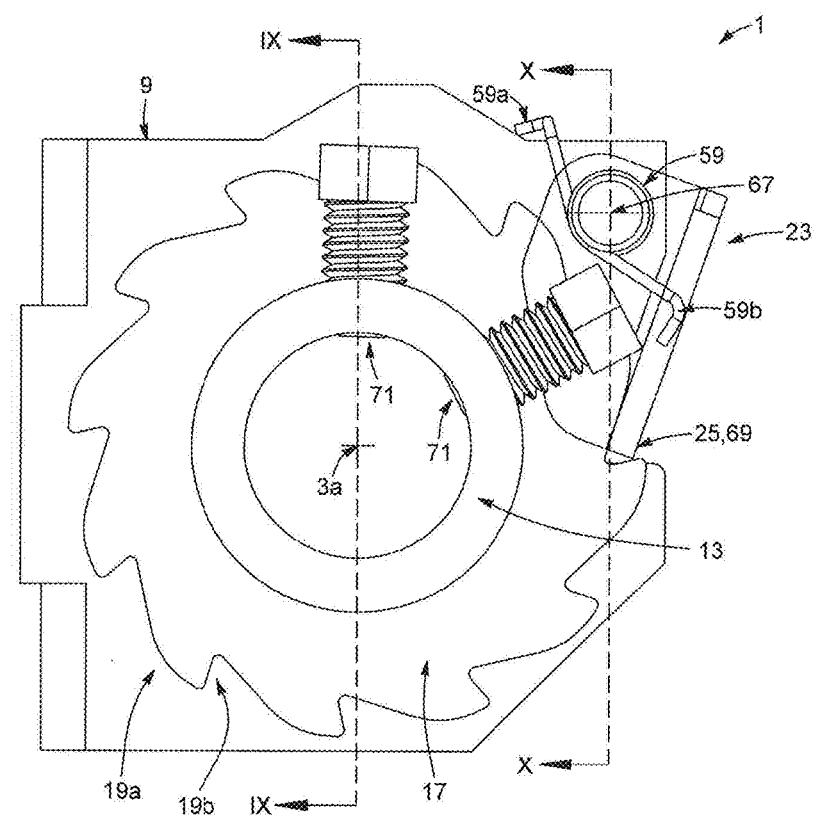
FIG. 8 is a front elevational view of what is shown in FIG. 5.

The bridging flange (65) of the pawl component (23) can have a distal rim (69) being positioned, shaped and sized with respect to said at least one recess (21) of the ratchet wheel (17) for allowing rotation of the shaft (3) along the winding direction (7a), and for blocking rotation of the shaft (3) along the winding direction (7b), and according to one possible embodiment, the pawl component (23) has a substantial U-shaped cross-sectional profile, as better shown in FIGS. 5-7.

Referring now to FIGS. 5-9, and according to one possible embodiment, the securing assembly (15) may comprise at least one fastener (71) insertable into a corresponding through-hole (73) provided about the collar portion (13), the at least one fastener (71) being engageable with the shaft (3) for preventing rotation of the shaft (3) with respect to the collar portion (13). Preferably, the at least one fastener (71) comprises a pair of fasteners (71) insertable into a corresponding pair of through-holes (73) provided about the collar portion (13), each fastener (71) being engageable with the shaft (3) for preventing rotation of the shaft (3) with respect to the collar portion (13), with each fastener (71) being threadedly engageable into a corresponding through-hole (73).

According to another aspect of the present system, the tensioning assembly (1) comprises a restraining assembly (75) for restraining axial movement of the collar portion (13) with respect to the support bracket (9). The restraining assembly (75) can come in many shapes and forms, but according to one possible embodiment, the restraining assembly (75) comprises a circlip (77) removably mountable onto a corresponding peripheral groove (79) provided on the hub portion (51), as better shown in FIGS. 6, 7 and 9. Alternatively, the restraining assembly (75) could comprise a cotter pin insertable into a transversal bore provided on the shaft (3).

The present tensioning assembly (1) may be used for various applications. For example, the tensioning assembly (1) may be used with a counterbalancing system (5) of a trailer truck, for example, or it may be used with a skirting system (5) of the trailer truck.

According to another aspect of the present invention, there is also provided a counterbalancing system (5) being provided with a tensioning assembly (1) such as the one briefly described herein and such as the one exemplified in the accompanying drawings.

According to yet another aspect of the present invention, there is also provided a kit with components for assembling a tensioning assembly (1) such as the one briefly described herein and such as the one exemplified in the accompanying drawings.

Having described some of the optional components and features of the present tensioning assembly (1), some of the potential benefits of the use of the present invention will now be described.

Figure 4:
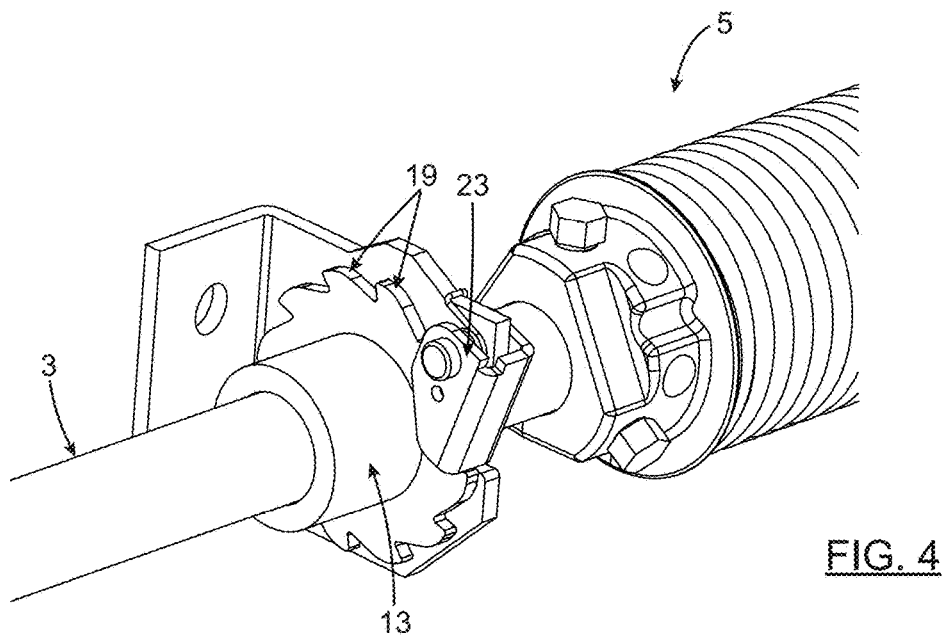
FIG. 4 is a partial perspective view of a winding system (ex. overhead counterbalancing system of a truck door) provided with a tensioning assembly according to a possible embodiment of the present invention.

For example, FIG. 4 is a partial perspective view of a counterbalancing system (5) provided with a tensioning assembly (1) (similar to a "ratchet system", etc.) according to a possible embodiment of the present invention. The ratchet wheel (17) may have an extruded hub portion (51) to fix the ratchet wheel (17) to the tubular shaft (3). For example also, the ratchet wheel (17) has a suitable number of teeth (19), such as twelve teeth (19) given as one possible embodiment, as shown, to offer a good adjustability.

According to another possible embodiment, the pawl component (23) is positioned, shaped and sized to enclose a portion of the teeth (19) of the ratchet wheel (17) to prevent lateral movement (i.e. movement along the axis of the shaft (3), etc.). The pawl component (23) and support bracket (9) may have some holes for inserting fixing pins therein. Other securing means could also be used.

As can also be easily understood from FIG. 4, the present tensioning assembly (1) and all of the components thereof are configured to fit in the same space as the current side brackets (107) (see FIG. 2, for example).

As previously mentioned, the ratchet wheel may have a suitable number of teeth (1, 2, 3, 4, 5, 6, 7, 8, 9, 10, 11, 12, 13, 14, 15, 16, 17, 18, 19, 20, 21, etc.), twelve teeth being shown in the illustrated embodiment of FIG. 4, to increase the adjustability of the system.

With twelve teeth, for example, it reduces the adjustment to about 30 degrees which facilitates this operation. The present ratchet wheel (17) is configured to fit in the same virtual space as the current anchor bracket. Also, the present ratchet wheel (17) can be fixed permanently to the tubular shaft (3). According to a possible embodiment, the pawl component (23) which blocks the rotation of the shaft (3) (by blocking a given tooth, etc.) is also meant to enclose a portion of the ratchet wheel (17) so as to prevent and/or block the lateral movement of the shaft (3) (indeed, in conventional systems, lateral movement of the shaft (3) can make the system become inoperable, etc.).

Advantageously, with the present ratchet system (1), since the torque is held by the pawl component (23) and ratchet wheel (17), a winding plug can be fixed to the shaft and needs no adjustment. The tubular shaft is therefore not and/or minimally deformed and strength of the tubular shaft is not and/or minimally affected by multiple screw marks. Furthermore, the square section of the tubular shaft is not needed anymore since the ratchet wheel (17) blocks the rotation of the tubular shaft (3) which in turn enables to reduce the quantity of manufacturing steps, etc.

In contrast, with conventional systems, turns needed to be added separately to each spring to put the right tension to counterbalance the door. Now with the present system, turns are added to the tubular shaft (3) which applies tension to both springs at the same time which save time, money, efforts, etc. Adding turns to the tubular shaft (3) can be done using the winding hole of the plug or a ratchet wrench or any other means to turn the tubular shaft (3). Tension is always secured by the ratchet wheel (17). Installer can release tension at any time with little and/or no adverse effects. Namely, installation can be done with one hand only.

Given that trucks are subject to lots of vibrations due to the different road surfaces, conditions, etc., vibration can cause some parts to become inoperative especially when movement of the parts is not completely locked and secured. Therefore, once adjustment of the spring tension is completed, a cotter pin (81) is inserted in the pawl component (23) and support bracket (9) to lock the torque and prevent any unwinding of the system (1), thus, the present system also act as a "tension holding system (1)".

It is worth mentioning that several modifications could be made to the present ratchet system and corresponding components, without departing from the scope of the present invention. For example, and as mentioned earlier, the ratchet wheel might have a different number of teeth. Also, the support bracket (9) could be mounted anywhere along the counterbalance shaft line, not restricted to the center only. Furthermore, and as shown, the hub portion (51) could also extend on both sides of the ratchet wheel (17), and a suitable retaining assembly could be provided, such a ring removably mountable about a corresponding section of the hub portion (51) (and/or about a corresponding groove (79) of the hub portion (51) for receiving the ring, as shown).

As may now be better appreciated, the present tensioning assembly (1) or "ratchet system" is advantageous over in that it enables to facilitate winding (and/or conservation of tension) in a counterbalancing system (5) (ex. such as those in overhead doors of trucks, vans and the like), in a simpler, easier, faster, more effective and/or more reliable manner.

Finally, and as can be easily understood, the present tensioning assembly (1) and corresponding parts can be made of substantially rigid materials, such as metallic materials, hardened polymers, composite materials, and/or the like, as well as possible combinations thereof, depending on the particular applications for which the tensioning assembly (1) is intended, and the desired end results.

Of course, and as can be easily understood by a person skilled in the art, the scope of the claims should not be limited by the possible embodiments set forth in the examples, but should be given the broadest interpretation consistent with the description as a whole.

The invention claimed is:

1. A tensioning assembly for winding a shaft of a winding system of a counterbalancing system of a trailer truck, the shaft being rotatable within the winding system along opposite winding and unwinding directions, the tensioning assembly comprising:
   a support bracket connectable to a fixed frame, and having an orifice shaped and sized for receiving the shaft of the winding system through said orifice;
   a collar portion removably mountable onto the shaft, and being proximate to the support bracket, the collar portion having a securing assembly for removably securing the collar portion onto the shaft;

a ratchet wheel securely mounted onto the collar portion and being rotatable therewith, the ratchet wheel being positionable adjacent to the support bracket, and being provided with a plurality of teeth and a plurality of corresponding recesses; and a pawl component operatively mountable on the support bracket and being moveable with respect to said support bracket, the pawl component having an extremity being positioned, shaped and sized with respect to at least one recess of the ratchet wheel for allowing rotation of the shaft along the winding direction, and for blocking rotation of the shaft along the unwinding direction;

wherein the support bracket comprises a mounting portion and a protruding portion, the orifice being provided on the protruding portion of the support bracket;

wherein the mounting portion comprises at least one mounting plate and a wall bracket;

wherein the wall bracket comprises an abutment flange for abutting against a surface of the protruding portion of the support bracket;

wherein the tensioning assembly comprises a hub portion, the hub portion being configured for removably mounting onto the support bracket;

wherein the hub portion is configured for removably mounting into the orifice of the support bracket;

wherein the hub portion is securely mounted to the collar portion;

wherein both the collar portion and the hub portion are cylindrical;

wherein both the collar portion and the hub portion have a substantially same inner diameter, said inner diameter being configured for receiving the shaft of the winding system therethrough;

wherein the ratchet wheel comprises n teeth, and n−1 corresponding recesses, n being greater than 2;

wherein the pawl component is operable between an engaged configuration with respect to the ratchet wheel where the shaft is biased to rotate only along the winding direction, and a disengaged configuration with respect to the ratchet wheel where the shaft is allowed to rotate along both winding and unwinding directions;

wherein the pawl component comprises first and second flanges connected by a bridging flange, the pawl component being positioned, shaped and sized so as to contain the ratchet wheel between its first and second flanges;

wherein the pawl component is further positioned, shaped and sized so as to contain the ratchet wheel and a portion of the support bracket between its first and second flanges;

wherein the pawl component is pivotably mountable with respect to the support bracket via a pivot extending through at least one of the first and second flanges; and wherein the bridging flange of the pawl component has a distal rim being positioned, shaped and sized with respect to said at least one recess of the ratchet wheel for allowing rotation of the shaft along the winding direction, and for blocking rotation of the shaft along the winding direction.

2. The tensioning assembly according to claim 1, wherein said at least one mounting plate comprises a pair of opposite mounting plates.

3. The tensioning assembly according to claim 1, wherein the wall bracket comprises at least one mounting hole configured for alignment with at least one corresponding mounting hole of the at least one mounting plate.

4. The tensioning assembly according to claim 1, wherein the wall bracket comprises at least one securing hole configured for receiving a corresponding fastener in order to secure the wall bracket onto the fixed frame.

5. The tensioning assembly according to claim 1, wherein the wall bracket comprises a pair of mounting holes configured for alignment with a pair of corresponding mounting holes of the at least one mounting plate, and wherein the wall bracket further comprises a pair of securing holes configured for receiving corresponding fasteners in order to secure the wall bracket onto the fixed frame.

6. The tensioning assembly according to claim 5, wherein the mounting holes of the wall bracket are more distally apart from one another than the securing holes of the wall bracket.

7. The tensioning assembly according to claim 1, wherein the abutment flange is provided with an arched notch being complementary to the shaft extendable through the orifice of the support bracket.

8. The tensioning assembly according to claim 1, wherein the collar portion and the hub portion have different outside diameters.

9. The tensioning assembly according to claim 1, wherein the collar portion and the hub portion are made integral to one another.

10. The tensioning assembly according to claim 1, wherein the ratchet wheel comprises 12 teeth, and 11 corresponding recesses, so as allow the shaft to rotate along the winding direction by rotational increments of about 30° angles.

11. The tensioning assembly according to claim 1, wherein the teeth of the ratchet wheel each include a sliding portion and a stopping portion.

12. The tensioning assembly according to claim 1, wherein the pawl component is biased towards an engagement configuration via a spring, the spring having one end operatively connectable to the support bracket and another end operatively connectable to the pawl component.

13. The tensioning assembly according to claim 1, wherein the pawl component is further positioned, shaped and sized so as to contain a main portion of the spring between its first and second flanges.

14. The tensioning assembly according to claim 1, wherein the pivot extends through both of the first and second flanges.

15. The tensioning assembly according to claim 1, wherein the pivot extends through a main portion of the spring.

16. The tensioning assembly according to claim 1, wherein the pawl component has a substantially U-shaped cross-sectional profile.

17. The tensioning assembly according to claim 1, wherein the securing assembly comprises at least one fastener insertable into a corresponding through-hole provided about the collar portion, the at least one fastener being engageable with the shaft for preventing rotation of the shaft with respect to the collar portion.

18. The tensioning assembly according to claim 17, wherein the at least one fastener comprises a pair of fasteners insertable into a corresponding pair of through-holes provided about the collar portion, each fastener being engageable with the shaft for preventing rotation of the shaft with respect to the collar portion.

19. The tensioning assembly according to claim 17, wherein each fastener is threadedly engageable into a corresponding through-hole.

20. The tensioning assembly according to claim 1, wherein the tensioning assembly comprises a restraining assembly for restraining axial movement of the collar portion with respect to the support bracket.

21. The tensioning assembly according to claim 20, wherein the restraining assembly comprises a circlip removably mountable onto a corresponding peripheral groove provided on the hub portion.

22. A counterbalancing system provided with the tensioning assembly according to claim 1.

23. A kit with components for assembling the tensioning assembly according to claim 1.

* * * * *